United States Patent Office 3,342,282
Patented Sept. 19, 1967

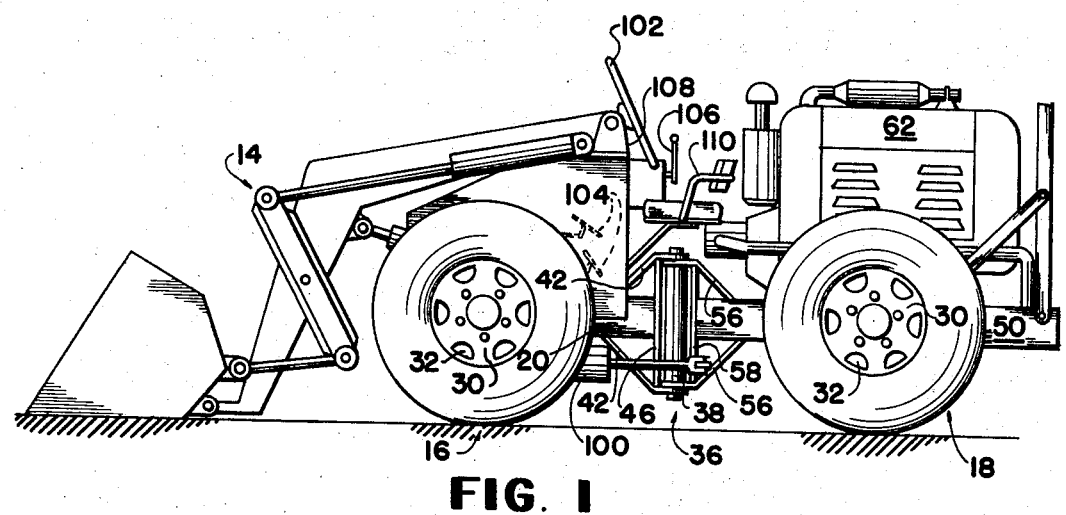
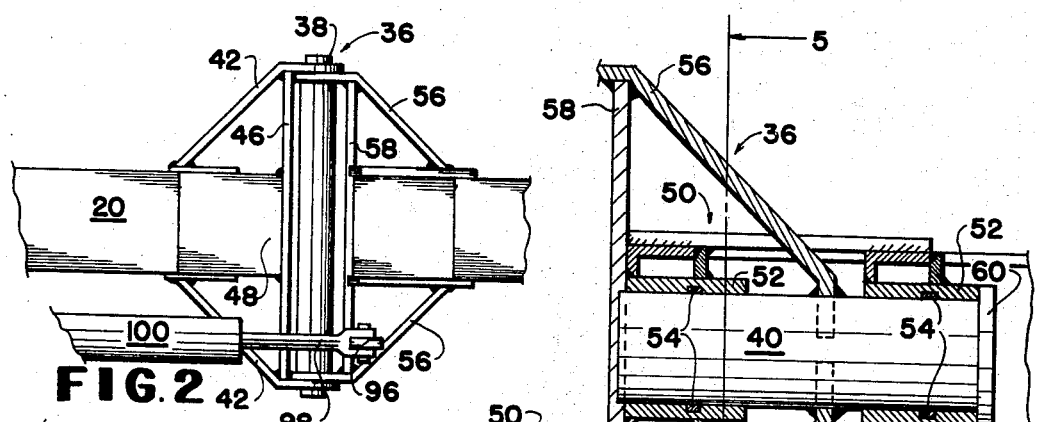
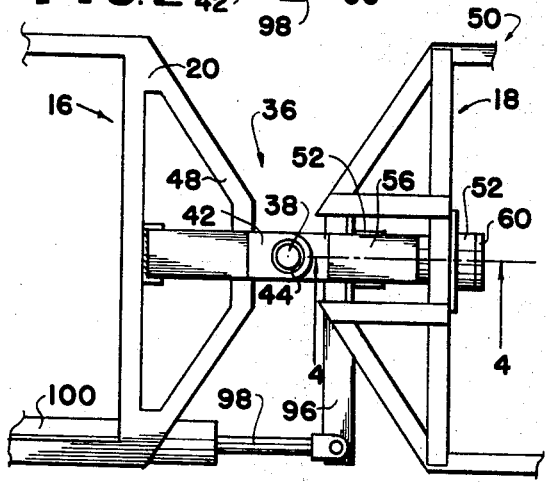

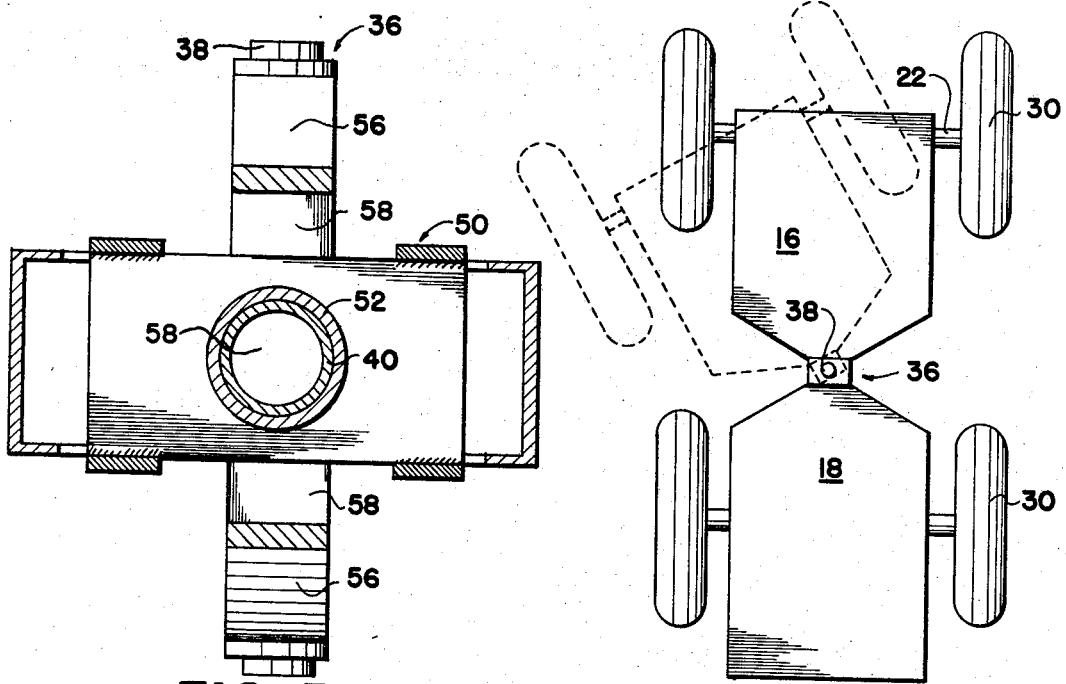
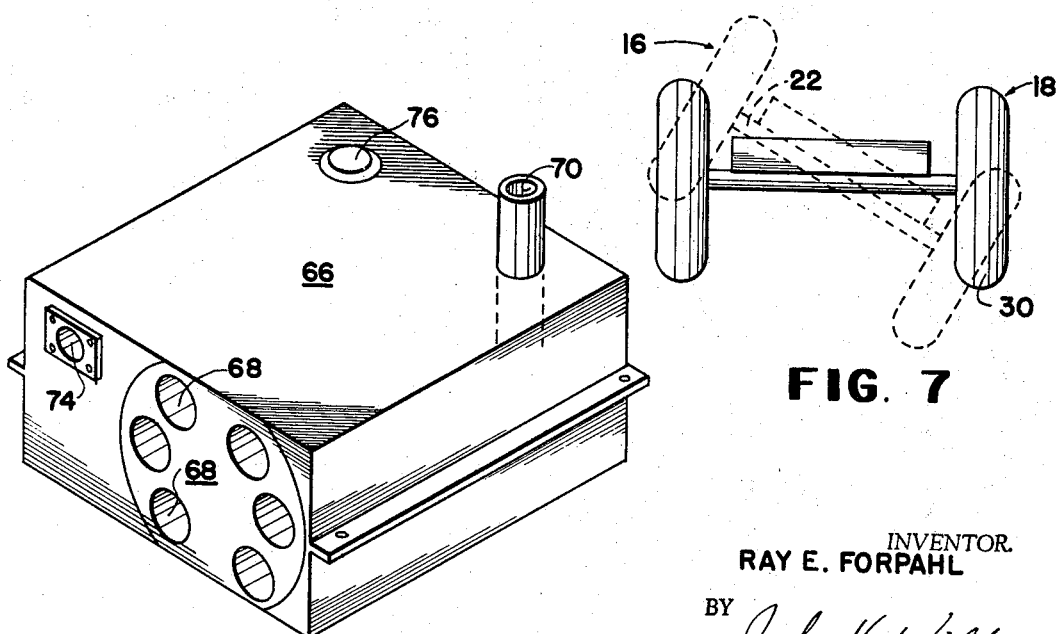

3,342,282
HYDRAULICALLY DRIVEN ARTICULATED
VEHICLE
Ray E. Forpahl, Harper, Kans., assignor to Harper
Manufacturing, Inc., Harper, Kans., a corporation
of Kansas
Filed June 14, 1965, Ser. No. 463,647
6 Claims. (Cl. 180—51)

This invention relates to a hydraulically driven articulated vehicle, and more particularly to an articulated vehicle wherein all wheels are driven hydraulically.

Articulated vehicles are well known, particularly in connection with dirt moving and construction applications. The advantages of such articulated construction, such as smaller turning radius, constant contact of wheels with the ground especially on rough surfaces without spring suspension means which allows the vehicle chassis to be simply and ruggedly constructed, are all apparent to those familiar with this type of vehicle. It has been found, however, that it is often desirable for such vehicles to have all wheels driven instead of only those in one of the articulated segments, to allow such vehicles to negotiate especially rough or muddy terrain. To accomplish this purpose, the prior art discloses complicated arrangements of drive shafts and universal joints with resultant equally complicated couplings for joining the segments of the vehicle.

A further difficulty is encountered where it is desired to fabricate a four wheel drive articulated vehicle that is small and compact. It is apparent to those skilled in the art that there must be a minimum amount of space to accommodate the drive shaft and universal apparatus without unduly limiting the turning radius of the vehicle. As a result, vehicles of this class have perforce been of large size and have not been available to those desiring an articulated vehicle of modest cost and size, or adaptable to conditions where work space is limited for the operation of such a vehicle.

I have invented a hydraulically driven articulated vehicle which has two chassis. There is a front chassis and rear chassis and they are pivotally mounted together. Hydraulic means are drivingly mounted on at least one of the chassis means. Power means are mounted on one of the chassis means. The power means is drivingly connected to the hydraulic means to drive the pivotally mounted chassis means by hydraulic means.

The vehicle that I have invented is a comparatively small and compact all wheel drive articulated vehicle that is simple to maintain and economical to construct. All of the wheels of my vehicle are driven by hydraulic motors with the hydraulic fluid under pressure from a pump being communicated to the motors by flexible high pressure fluid lines. This of course obviates the necessity of complicated drive shaft and universal joint apparatus necessary to communicate power from one articulated section to the other in vehicles of this type.

Since the vehicle that I have invented dispenses with the complicated drive shaft and universal joint apparatus, I have provided a simplified coupling on my vehicle which consists of a vertical trunnion which allows the vehicle to be turned in a very short radius, and a longitudinal horizontal trunnion which allows the two articulated segments of the vehicle to swivel in relation to each other. This swiveling action keeps all wheels of the vehicle in contact with the ground at all times without the use of spring arrangements or the like.

The vehicle of my invention can be of any size since the limiting factors inherent in the prior art have been overcome by my invention. As a result, my vehicle is easily adaptable to a large number of uses providing greater efficiency and ruggedness at a lesser cost.

It is an object of this invention to provide a new hydraulically driven articulated vehicle.

It is another object of this invention to provide a new articulated vehicle having all wheels driven.

Still another object of this invention is to provide an all wheel driven articulated vehicle that requires no drive shafts and universal joints between the articulated segments.

Yet another object of my invention is to provide an all wheel driven articulated vehicle not limited as to size.

One more object of my invention is to provide a new hydraulic means for driving all wheels of an articulated vehicle.

And another object of this invention is to provide a new coupling means for an articulated vehicle.

Various other objects, advantages, and features of the invention will become apparent to those skilled in the art from reading this disclosure.

Drawings accompany and are a part of this disclosure. These drawings depict preferred specific embodiments of the hydraulically driven articulated vehicle of my invention, and it is to be understood that these drawings are not to unduly limit the scope of the invention. In the drawings, FIG. 1 is a side elevational view of a preferred specific embodiment of my invention showing an earth moving device in connection therewith.

FIG. 2 is a side elevational view of a preferred coupling of the vehicle of my invention.

FIG. 3 is a top plan view of portions of a preferred specific front and a rear chassis of my invention depicting the coupling arrangement joining the chassis together.

FIG. 4 is a cross sectional view taken along 4—4 of FIG. 3.

FIG. 5 is a view in cross section taken along line 5—5 of FIG. 4.

FIG. 6 is a top plan schematic view of a preferred specific construction of a chassis of my invention showing the swiveling effect of the chassis on a vertical trunnion.

FIG. 7 is an end view in schematic showing a preferred specific swiveling effect of the chassis on a horizontal trunnion.

FIG. 8 is a perspective view of the preferred specific hydraulic fluid storage and cooling tank.

Figure 9:
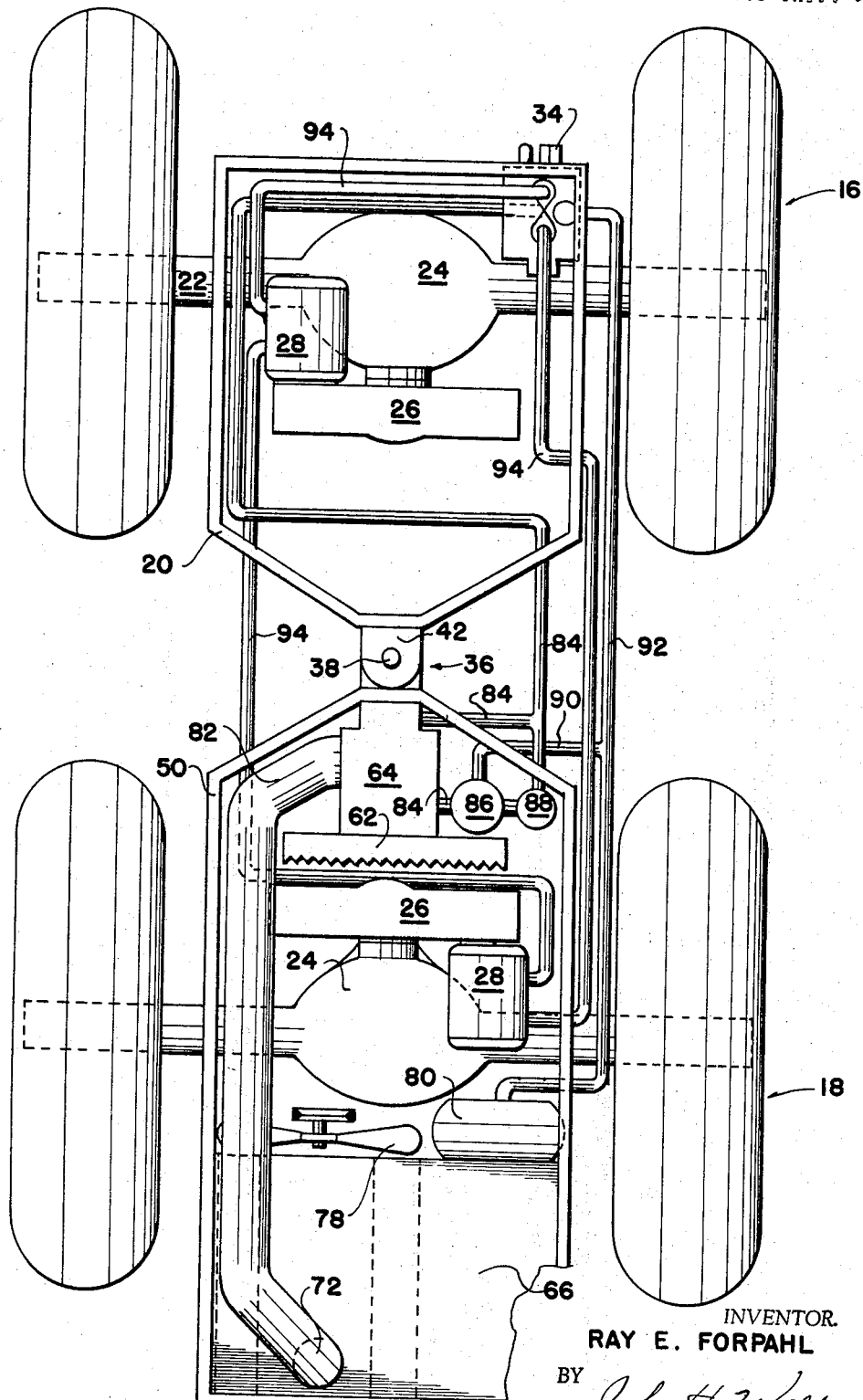
FIG. 9 is a top plan view partially in schematic showing a preferred specific embodiment of a hydraulic system mounted on a chassis of my invention.

In the following is a discussion and description of the invention, made with reference to the drawings whereon the same reference numerals are used to indicate the same or similar parts and/or structure. The discussion and description is of preferred specific embodiments of the new hydraulically driven articulated vehicle of my invention, and it is to be understood that the discussion and description is not to unduly limit the scope of the invention.

Referring to the drawings in detail, FIG. 1 shows a tractor type vehicle suitable for loading and unloading unconsolidated materials such as dirt, sand, grain or the like. This, of course, is only one of many possible specific applications of my invention. Many other tool and work devices can be attached to or used in conjunction with the vehicle that I invented, but hydraulically operated tool devices have proved most satisfactory by reason of the reserve of hydraulic power means in my vehicle. In this instance, a hydraulic powered shovel device is shown generally at 14.

My vehicle has a front chassis referred to generally at 16 and a rear chassis referred to generally at 18. The front chassis 16 has a horizontally disposed frame member 20. Front axle means 22 are mounted in a forward portion of the frame member 20, a differential 24 is mounted on the axle means 22 and a transmission 26 is connected to the differential 24. The axle means 22, differential 24 and transmission 26 can be of any suitable type, but preferably of a heavy duty tractor type or the like. The transmission 26 can have any number of suitable speeds, but preferably of a rugged simple two speed type. Reverse gears could be utilized, but, as will be hereinafter discussed, a preferred transmission 26 need not include reversing mechanism. It is noted that my invention does away with the necessity of any type of clutch for operation of the vehicle.

A hydraulic motor 28 is mounted on the chassis 16 and is connected to the transmision 26 by suitable drive means. Wheels 30 with tires mounted thereon are mounted on end portions of the axle means 22. Hydraulic brake assemblies 32 are mounted on each wheel 30. A four way hydraulic valve 34 is mounted on a forward portion of the front chassis 16. This valve can be of any suitable type that will reverse the flow of fluids under pressure, such as a lift valve, slide valve, piston valve or the like. It has been found in practice, however, that a control valve having sliding plungers is very satisfactory for use with my invention. The New York Air Brake Company of Kalamazoo, Mich. markets a very satisfactory valve under the trademark Hydreco known as a V-38 Tandem Circuit Valve described in Instruction Sheet No. 12-200.4, dated Dec. 1, 1963.

A coupling referred to generally at 36 connects the rear chassis 18 to the front chassis 16. This coupling 36 has a vertical trunnion 38 and a horizontal trunnion 40. Front arm members 42 are oppositely and rigidly mounted on the frame member 20 preferably by welding and project rearwardly from the frame member 20 at an angle of from 30 to 60 degrees, but preferably at an angle of approximately 45 degrees. The vertical trunnion 38 has a trunnion bearing 44 mounted on each end portion. This bearing can be any suitable type of trunnion bearing such as roller, ball, sleeve or the like, but preferably on a bronze sleeve bearing. The end portion of each arm member 42 has a circular hole (not shown). This hole is preferably drilled and has a diameter approximately the same as the outside diameter of the trunnion bearing 44 so that the holes in the arm members 42 can engage the bearings 44 in a press fit when mounted thereon. One of the arm members 42 is so mounted on the top portion of the vertical trunnion 38, and the other arm member 42 is likewise mounted on the bottom portion of the vertical trunnion 38. When so mounted, the ends of the vertical trunnion 38 project through the holes in the arm members 42. A vertical plate 46 is rigidly mounted, preferably by welding, on and between the arm members 42 parallel to and in close proximity with the vertical trunnion 38. A transverse member 48 of the frame member 20 is rigidly mounted on a center front portion of the vertical plate 46.

The rear chassis 18 also has a horizontally disposed frame member 50 which is turnably mounted on the horizontal trunnion 40 by two spaced rear trunnion bearings 52. These bearings can be any suitable trunnion bearing such as ball, roller, bronze and the like, but preferably of steel and having at least one grease channel 54 therein to lubricate same. Two rear arm members 56 are rigidly mounted on the horizontal trunnion 40 between the bearings 52. These are preferably mounted by cutting an arc in one portion of each arm 56 to conform to the circumferential dimension of the horizontal trunnion 40 and welding these end portions to the trunnion 40 in vertically diametrically opposed positions. The forward projecting portions of the rear arms 56 have similar holes and are mounted in a similar manner to the vertical trunnion 38 as the projecting arms 42 of the front frame member 20. A preferred mounting is as shown on FIG. 2 where the rear arm end portions 56 are mounted inside of the front arm 42 end portions. A rear vertical plate 58 is mounted preferably by welding on and between the rear arm members 56 parallel to and in close proximity with the vertical trunnion 38. One end portion of the horizontal trunnion 40 is rigidly mounted preferably by welding on the rear center portion of the rear vertical plate 58. A circular thrust plate 60 is rigidly mounted preferably by welding on the other end portion of the horizontal trunnion 40, engaging the rearwardly mounted horizontal trunnion bearing 52.

Axle means 22, wheels with the tires 30, hydraulic brake assemblies 32, a differential 24, transmission 26, and a motor 28, all being the same as these mounted on the front chassis 16, are mounted in a similar manner on the rear chassis 18. An engine 62 is mounted on the rear chassis 18. This engine can be of any suitable type such as gasoline, diesel, gas turbine and the like, but preferably an internal combustion gasoline engine.

A double hydraulic pump 64 is drivingly mounted to the engine 62 and on the rear chassis 18. This pump can be any type of hydraulic pump common to the art such as gear, reciprocating and the like, but preferably a vane type pump having two vane units and two high pressure outlets. The Vickers Pump Company of Detroit, Michigan supplies a very suitable pump of this type such as a Model 35251, constant displacement-vane type, as described in the "Vicker's Catalog," page M-2226. A hydraulic fluid cooling and storage tank 66 is mounted in a rear portion of the rear chassis 18. This tank has cooling flues 68 passing through it. These can be any number of flues 68 in the tank 66, but it has been found that six flues 68 provide adequate cooling area for the hydraulic fluid under ordinary working conditions. A filling aperture 70, a suction aperture 72, a return aperture 74, and a gauge aperture 76 are fabricated in the tank 66. A cooling fan 78 is mounted on the chassis 18 immediately adjacent to one end of the flues 68 in the tank 66 to air cool the fluid. The fan 78 is drivingly connected to the engine 62 by suitable means (not shown). A hydraulic fluid filter 80 is mounted on the tank 66 intercommunicating with the return aperture 74.

A suction line 82 connects the tank 66 with the pump 64. A fluid pressure line 84 is connected to each vane unit discharge of the pump 64. A pressure relief valve 86 and a check valve 88 are mounted in series on one of the pressure lines 84 with the relief valve 86 being nearer the pump 64. The relief valve 86 has a relief discharge line 90 which connects to a return line 92. The two pressure lines 84 join behind the check valve 88 and connect to the valve 34. Motor fluid lines 94 connect the valve 34 and the motors 28 in series. The return line 92 connects the valve 34 with the filter 80.

In operation the hydraulic system drives the vehicle. Hydraulic fluid enters the pump 64 from the tank 66 through the suction line 82 where the two pump units discharge fluid under pressure into the pressure lines 84. The relief valve 86 is set at a suitable pressure relief point for normal operating requirements. A preferred point is between 750 and 1,250 pounds and preferably at 1,000 pounds. When load demands exceed this 1,000 pound setting, the relief valve 86 opens and discharges all the fluid being pumped by one of the pump units into the return line 92 through the discharge line 90 allowing this pump unit to operate under no load conditions and permitting all the power of the engine 62 to be utilized in driving the other pump to produce pressures up to preferably between 2,000 and 3,000 pounds to drive the motors when load demands are great. The check valve 88 closes the pressure line 84 so that highly pressurized fluid cannot enter the no-load pump unit. As the load is decreased and the fluid velocity is increased, pressure returns to the normal range and the relief valve is automatically closed, providing a greater volume of fluid to the motors for greater speed. Of course, the operating pressure limits in the hydraulic system are determined by the pressure ratings of the component parts and are therefor quite flexible, depending on the capacities desired in the installation.

The fluid under pressure passes through line 84 to the valve 34 where its direction of flow is determined by the positioning of the sliding plungers in the valve 34. A high pressure safety relief valve is preferably a part of the valve 34 allowing fluid to be discharged in the return line 92 when maximum safety pressures have been exceeded. The fluid is directed by the valve 34 into the motor lines 94 in either direction and returned to the valve 34 where it is directed into the return line 92. The fluid lines can be made of any suitable tubing or pipe, such as copper tubing, metal pipe, flexible tubing and the like, but preferably of a flexible metal and plastic conduit.

The action of the control valve 34 in reversing the flow or fluid through the lines 94 to the motors 28 allows these motors 28 to rotate in either direction and thus drive the vehicle either forward or back without the necessity of providing gearing and clutch mechanisms to accomplish this reversing process.

A horizontally disposed steering arm 96 is rigidly mounted on and between the rear vertical plate 58 and the lower of the rear arm members 56, preferably by welding. This steering arm 96 extends transversely to a point nearly in line with the outside longitudinal member of rear frame member 50, and to either side of the vehicle. A hydraulic piston rod 98 is pivotally mounted on the projecting end portion of the steering arm 96 and is slidably mounted in a hydraulic cylinder means 100, which is pivotally mounted on the front axle means 22. The hydraulic cylinder means 100 is operably connected to power steering means 102, whereby the sliding action of the piston rod 98 in the hydraulic cylinder means 100 causes chassis 16 to pivot on the vertical trunnion 36 and turn the vehicle.

An operator's area in an upper central portion of the vehicle has hydraulic control means 104, transmission control means 106, steering means 102, engine control means 108 and a seat all mounted therein.

All the materials used in the fabrication of the vehicle that I invented are those commonly used in the construction of vehicles of this class, preferably primarily of iron and steel.

My new vehicle is constructed and adapted to have all wheels driven hydraulically by the engine 62 driving the pump 64 which drives the hydraulic system as hereinbefore set forth which in turn drives the transmission 26, differentials 24, axle means 22 and wheels 30. The coupling arrangement provides means for the chassis 16 and 18 to swivel in two directions in relation to each other.

The foregoing discussion and description has been made in connection with preferred specific embodiments of the hydraulically driven articulated vehicle of my invention. However, it is to be understood that the discussion and description is only intended to illustrate and teach those skilled in the art how to practice the invention, and such is not to unduly limit the scope of the invention, which is defined in the claims set forth hereinafter.

I claim:

1. A hydraulically driven articulated vehicle comprising, a front chassis and a rear chassis, said front chassis having a horizontally disposed frame member, front axle means rigidly mounted on the forward portion of said frame member, differential means drivingly mounted on said axle means, transmission means drivingly mounted on said differential means, a hydraulic motor drivingly connected to said transmission means, wheel means mounted on end portions of said axle means, hydraulic brake means mounted on said wheel means, and a four way hydraulic control valve mounted on a forward portion of said front chassis, a coupling for connecting said front chassis to said rear chassis having a vertical trunnion, front arm members oppositely and rigidly mounted on said frame member and projecting rearwardly therefrom, the projecting end portion of each of said front arms having a circular hole therein, said trunnion having a trunnion bearing mounted on each end portion thereof, one of said projecting arm end portions mounted on the top end portion of the said vertical trunnion and engaging the said vertical trunnion bearing mounted thereon, the other of the said projecting arm end portions mounted on the bottom end portion of the said vertical trunnion and engaging the said vertical trunnion bearing mounted thereon, a vertical trunnion end portion and vertical trunnion bearing projecting through the said hole in the projecting end portion of one of said arm members, the other of said vertical trunnion end portions and vertical trunnion bearings projecting through the said hole in the end portion of the other of said projecting arm members, a vertical plate mounted on and betwen said arm members parallel to and in close proximity with said trunnion, a transverse member of said frame member rigidly mounted on the center front portion of said vertical plate, said rear chassis having a horizontally disposed rear frame turnably mounted on a horizontal trunnion by two spaced trunnion bearings mounted on said horizontal trunnion and supporting said rear frame member, two rear arm members oppositely and rigidly mounted in a vertically diametrically opposed position on said horizontal trunnion between said last-named trunnion bearings and projecting forwardly from said rear frame, the projecting end portion of each of said rear arms having a circular hole therein, one of said projecting rear arm end portions mounted on the top end portion of the said vertical trunnion and engaging the said vertical trunnion bearing mounted thereon, the other of said projecting rear arm end portions mounted on the bottom end portion of the said vertical trunnion and engaging the said vertical trunnion bearing mounted thereon, a vertical trunnion end portion and vertical trunnion bearing projecting through the said hole in the projecting end portion of one of said rear arm members, the other vertical trunnion end portions and vertical trunnion bearing projecting through the said hole in the end portion of the other of said projecting rear arm members, a rear vertical plate mounted on and between said rear arm members parallel to and in close proximity with said vertical trunnion, one end portion of said horizontal trunnion mounted on the center rear portion of said rear vertical plate, a circular thrust plate rigidly mounted on the other end portion of said horizontal trunnion and engaging one of said horizontal trunnion bearings, rear axle means rigidly mounted on said rear frame in the rearward portion thereof, rear wheel means mounted on said rear axle means, rear hydraulic brake means mounted on said rear wheel means, rear differential means drivingly mounted on said rear axle means, rear transmission means drivingly connected to said rear differential means, a rear hydraulic motor drivingly connected to said rear transmission means, an engine rigidly mounted on said rear chassis, hydraulic system comprising, a double hydraulic pump drivingly connected to said engine and mounted on said rear chassis, a hydraulic fluid storage and cooling tank mounted on a rear portion of said rear chassis, said tank having cooling flues, filling, suction and return apertures therein, and a cooling fan drivingly connected to said engine and mounted adjacent to said flues, a hydraulic fluid filter mounted adjacent to said return aperture, a suction line connecting said storage tank with said hydraulic pump, a discharge aperture from each unit of said double pump, a fluid pressure line mounted on one of said pump apertures, a pressure relief valve and a check valve mounted in series in said line, said relief valve mounted nearest to said pump and having a relief discharge line mounted thereon and connecting to a return line, the other of said pump apertures having a line mounted thereon connecting to said pressure line behind said check valve, said pressure line connected to said four way control valve, motor fluid lines connecting said control valve and said hydraulic motors in series, and said return line connecting said control valve and said filter, said control valve constructed and adapted to pass hydraulic fluid under pressure through said hydraulic motors in either direction, a horizontally disposed steering arm rigidly mounted on said rear vertical plate and the lower of the said rear coupling arms, said steering arm extending to one side of said vehicle, a hydraulic piston rod pivotally mounted on the projecting end of the said steering arm, said piston rod slidably mounted in hydraulic cylinder means, and said hydraulic cylinder means pivotally mounted to said axle means of said front chassis, and power steering means connected to said hydraulic cylinder means, an operators area in an upper central portion of said vehicle having hydraulic control means, transmission control means, steering means, engine control means, and a seat mounted therein, said vehicle constructed and adapted to hydraulically drive all wheels of an articulated vehicle by an engine drivingly connected to a double pump supplying hydraulic fluid under pressure through a control valve to a motor mounted on each articulated chassis, said motors driving said wheel means through axle means, differential means and tranmission means.

2. A hydraulically driven articulated vehicle comprising a front chassis and a rear chassis, both of said chassis having horizontally disposed frame members, axle means mounted on said frame members, differential means drivingly mounted on said axle means, transmission means drivingly mounted on said differential means, a hydraulic motor drivingly connected to each of said transmission means, wheel means mounted on end portions of said axle means, and a hydraulic control valve mounted on said front chassis, a coupling for connecting said front chassis to said rear chassis having a vertical trunnion, front arm members oppositely and rigidly mounted on said front chassis, said trunnion having a trunnion bearing mounted on each end portion thereof, said arm end portions turnably mounted on the end portions of the said vertical trunnion, said rear chassis frame member turnably mounted on a horizontal trunnion, two rear arm members oppositely and rigidly mounted on said horizontal trunnion, and the projecting end portion of each of said rear arms turnably mounted on the end portions of the said vertical trunnion, and engine mounted on said rear chassis, a hydraulic system mounted on said chassis comprising, a double hydraulic pump drivingly connected to said engine, a hydraulic fluid storage and cooling tank, a suction line connecting said storage tank with said hydraulic pump, fluid pressure lines mounted on said pump, a pressure relief valve and a check valve mounted in series in one of said lines, said pressure lines connected behind said check valve, said pressure line connected to said control valve, motor fluid lines connecting said control valve and said hydraulic motors in series, and a return line connecting said control valve and said tank, said control valve constructed and adapted to pass hydraulic fluid under pressure through said hydraulic motors in either direction, hydraulic cylinder means turnably connecting said rear chassis with said front chassis, and power steering means connected to said hydraulic cylinder means, an operators area having control means, said vehicle contructed and adapted to hydraulically drive all wheel means of an articulated vehicle by an engine drivingly connected to a double pump supplying hydraulic fluid under pressure through a control valve to a motor mounted on each articulated chassis.

3. A hydraulically driven articulated vehicle comprising a front chassis and a rear chassis, locomotive means mounted on each of said chassis, a hydraulic system having a hydraulic motor mounted on each chassis and drivingly connected by a transmission means to said locomotive means on the corresponding chassis, a control valve mounted on said front chassis, a hydraulic pump connected in series by a fluid pressure line to said control valve, a hydraulic cooling and storage tank mounted on said rear chassis, valve means mounted in said fluid pressure line and connected in series with said pump and control valve, hydraulic fluid lines connecting in series said control valve, and all said motors with said tank, said hydraulic system constructed and adapted to pass hydraulic fluid under pressure through said motors in either direction, said valve means having a relief valve operable at a pre-determined pressure to by-pass a portion of the hydraulic fluid under pressure into said tank to increase the pressure of the remaining fluid supplied to said motors for handling increased load conditions, a coupling for connecting said front chassis to said rear chassis having a vertical trunnion, a horizontal trunnion, front arm members mounted on said front chassis, rear arm members mounted on said horizontal trunnion, said front and rear arm members turnably mounted on said vertical trunnion, and said rear chassis turnably mounted on said horizontal trunnion, said vehicle constructed and adapted to hydraulically drive said locomotive means on each of said chassis.

4. In an articulated vehicle having, a coupling and a front chassis and a rear chassis pivotally mounted together by said coupling, powering means mounted on said chassis, axle means mounted on said chassis, wheel means mounted on said axle means, and differential and transmission means mounted on each of said chassis, that improvement comprising, in combination, a hydraulic system having a four way hydraulic control valve mounted on a front portion of the said front chassis, a double hydraulic pump drivingly connected to said powering means mounted on said rear chassis, a hydraulic fluid storage and cooling tank mounted on a rear portion of said rear chassis, said tank having cooling flues, filling, suction and return apertures therein, and a cooling fan drivingly connected to said power means and mounted adjacent to said flues, a hydraulic fluid filter mounted on said return aperture, a suction line connecting said storage tank with said hydraulic pump, a discharge aperture from each unit of said double pump, a fluid pressure line mounted on one of said discharge apertures, a pressure relief valve and a check valve mounted in series in said pressure line, said relief valve mounted nearest to said pump and having a relief discharge line mounted thereon and connecting to a return line, the other of said discharge apertures having a line mounted thereon connecting to said pressure line behind said check valve, said pressure line connected to said four way control valve, a hydraulic motor individual to each of said chassis and drivingly mounted to said transmission means on each of said chassis, motor fluid lines connecting said control valve and said hydraulic motors in series, and said return line connecting said control valve and said filter, said control valve constructed and adapted to pass hydraulic fluid under pressure through said hydraulic motors in either direction, said hydraulic system constructed and adapted to drive all wheel means of said vehicle through said transmission means, differential means and axle means.

5. A hydraulically driven articulated vehicle comprising, a front chassis and a rear chassis, locomotive means mounted on each of said chassis, a hydraulic motor means on each chassis drivingly connected through a corresponding transmission means to said locomotive means on the corresponding one of each of said chassis, pump means connected in series by a fluid pressure line to all said motor means, control valve means mounted in said fluid pressure line operably connected to said pump means and said motor means, said control valve means constructed and adapted to pass hydraulic fluid under pressure through said motor means in either direction, said valve means including a pressure relief valve, a check valve, and a directional valve connected in series in said fluid pressure line and operable under load conditions to increase the pressure of the hydraulic fluid to said motor means, coupling means for connecting said front chassis to said rear chassis having a vertical trunnion and a horizontal trunnion, said rear chassis turnably mounted on said horizontal trunnion, said front and rear chassis turnably mounted on said vertical trunnion whereby said vehicle constructed and adapted to be hydraulically driven on each of said front and rear chassis with said connecting means operable to continuously maintain contact with the supporting surface.

6. In an articulated vehicle having, a front chassis, a rear chassis, coupling means pivotally mounting together said front chassis and said rear chassis, axle and wheel means mounted on each of said chassis means, differential means and transmission means mounted on each of said chassis, the improvement comprising a hydraulic drive system having a control valve means, a hydraulic pump means connected by a fluid pressure line to said control valve means, a hydraulic fluid reservoir mounted on said rear chassis connected to said pump means, said pump means having a pair of discharge apertures, said fluid pressure line mounted on one of said discharge apertures, a pressure relief valve and a check valve mounted in said fluid pressure line, said relief valve having a relief discharge line mounted thereon and connected to a return line to said reservoir, the other of said discharge apertures having a line mounted thereon connecting to said fluid pressure line intermediate said check valve and said fluid pressure line connected to said control valve means, hydraulic motor means drivingly connected to said transmission means on each of said chassis, motor fluid lines connecting said control valve means and said motor means, said control valve means constructed and adapted to pass fluid through said motor means in either direction, and said relief valve operable under pressure to divert fluid through said return line to said reservoir to provide for an increased pressure in the fluid to supply said control valve means and said motor means to provide additional power for movement of the vehicle as required.

References Cited

UNITED STATES PATENTS

| | | |
|---|---|---|
| 2,835,397 | 5/1958 | Wagner. |
| 2,913,061 | 11/1959 | Beyerstedt et al. ____ 180—51 X |
| 3,151,694 | 10/1964 | Rogers _____ 180—51 |

FOREIGN PATENTS

| | | |
|---|---|---|
| 1,252,362 | 12/1960 | France. |
| 840,263 | 7/1960 | Great Britain. |

A. HARRY LEVY, *Primary Examiner.*